US008065835B2

(12) United States Patent
Hänsel et al.

(10) Patent No.: US 8,065,835 B2
(45) Date of Patent: Nov. 29, 2011

(54) DEVICE FOR DISPLACEABLY HOLDING A GLASS PANE IN A SLIDING RAIL

(75) Inventors: Mathias Hänsel, Rümmingen (DE); Michel Bremont, Gex (FR); Frédéric Laure, Bures sur Yvette (FR); Sébastien Lichtle, Huningue (FR)

(73) Assignee: A. Raymond et Cie, Grenoble (FR)

( * ) Notice: Subject to any disclaimer, the term of this patent is extended or adjusted under 35 U.S.C. 154(b) by 609 days.

(21) Appl. No.: 12/162,735

(22) PCT Filed: Jan. 18, 2007

(86) PCT No.: PCT/EP2007/000409

§ 371 (c)(1), (2), (4) Date: Aug. 6, 2008

(87) PCT Pub. No.: WO2007/090509

PCT Pub. Date: Aug. 16, 2007

(65) Prior Publication Data

US 2009/0019780 A1 Jan. 22, 2009

(30) Foreign Application Priority Data

Feb. 3, 2006 (DE) ........................ 10 2006 005 482

(51) Int. Cl.
*B60J 1/16* (2006.01)
*E05F 11/38* (2006.01)

(52) U.S. Cl. ................. 49/374; 49/348; 49/352; 49/502

(58) Field of Classification Search .................... 49/348, 49/349, 352, 351, 372, 374, 502
See application file for complete search history.

(56) References Cited

U.S. PATENT DOCUMENTS 5,669,181 A * 9/1997 Kollar et al. .................... 49/360
5,675,936 A * 10/1997 Kurth et al. ..................... 49/404
5,765,310 A * 6/1998 Gold .............................. 49/375
5,809,695 A * 9/1998 Strickland ........................ 49/352
6,018,913 A * 2/2000 Lin ................................ 49/414
6,119,401 A * 9/2000 Lin et al. ......................... 49/361
6,125,585 A * 10/2000 Koneval et al. ................. 49/349
(Continued)

FOREIGN PATENT DOCUMENTS

DE 3119701 12/1982
(Continued)

*Primary Examiner* — Katherine Mitchell
*Assistant Examiner* — Justin Rephann
(74) *Attorney, Agent, or Firm* — Baker & Daniels LLP

(57) ABSTRACT

A device for displaceably holding a glass pane (1) in a sliding rail has at least one fastening part (2) to which a hot-melt adhesive cushion (7) is fitted and which has at least one locking element (10, 11). Furthermore, there is an elongate holding rail (3) which can be brought into engagement with the or each locking element (10, 11). The or each locking element (10, 11) can be moved between a locking position, in which the or each fastening part (2) is connected fixedly to the holding rail (3), and a release position in which the engagement with the holding rail (3) is released and the glass pane (1) can be removed from the holding rail (3). As a result, repair due to wear of the holding rail (3) is less cost-intensive, since the glass pane (1) is connected releasably to the holding rail (3).

3 Claims, 3 Drawing Sheets

U.S. PATENT DOCUMENTS

| | | | | |
|---|---|---|---|---|
| 6,125,588 | A * | 10/2000 | Schultz | 49/375 |
| 6,131,339 | A * | 10/2000 | Ramus | 49/375 |
| 6,324,788 | B1 * | 12/2001 | Koneval et al. | 49/121 |
| 6,330,764 | B1 * | 12/2001 | Klosterman | 49/375 |
| 6,557,302 | B1 * | 5/2003 | Kaps | 49/375 |
| 6,591,552 | B1 * | 7/2003 | Rasmussen | 49/413 |
| 6,763,550 | B2 * | 7/2004 | Regnier | 16/193 |
| 2003/0093960 | A1 * | 5/2003 | Mizusawa et al. | 52/204.62 |
| 2004/0025439 | A1 | 2/2004 | Purcell | |
| 2005/0044799 | A1 * | 3/2005 | Kinross et al. | 49/413 |

FOREIGN PATENT DOCUMENTS

| | | | |
|---|---|---|---|
| DE | 9411104 | U1 | 10/1994 |
| DE | 102004005862 | A1 | 8/2005 |
| EP | 0294254 | A1 | 12/1988 |
| WO | WO0006864 | A1 | 2/2000 |

* cited by examiner

DEVICE FOR DISPLACEABLY HOLDING A GLASS PANE IN A SLIDING RAIL

CROSS-REFERENCE TO RELATED APPLICATION

This application is a U.S. National Phase Patent Application based on International Application Serial No. PCT/EP2007/000409 filed Jan. 18, 2007, the disclosure of which is hereby explicitly incorporated by reference herein.

BACKGROUND OF THE INVENTION

1. Field of the Invention

This invention relates to a device for displaceably holding a glass pane in a sliding rail.

2. Description of the Related Art

One known device for displaceably holding a glass pane in a sliding rail is disclosed by WO 00/06864 A. The previously known device for displaceably holding a glass pane in a sliding rail has at least one fastener to which is attached a hot melt adhesive cushion, and that has at least one locking element. There is also an elongated holding rail displaceably mounted in the sliding rail that can be brought into engagement with the locking element(s) in such a way that the glass pane is attached laterally to the holding rail. The locking element(s) can be switched between a locked position in which the fastener(s) is/are rigidly connected to the holding rail, and a release position in which the engagement with the holding rail is released and the glass pane can be taken out of the holding rail.

A device essentially corresponding to the aforementioned device is disclosed by U.S. Pat. No. 6,324,788 B1.

In devices known in practice for displaceably holding a glass pane, for example a displaceable side window or rear window in a vehicle, in a sliding rail, the glass pane is cemented to a holding rail that is mounted displaceably in the sliding rail. Even though this produces high stability, nevertheless the drawback exists here that when the holding rail wears out, the glass pane also has to be replaced.

SUMMARY OF THE INVENTION

The present invention provides a device for displaceably holding a glass pane in a sliding rail with which a glass pane is well-protected and is nevertheless mounted with easy access, and that can be replaced economically when worn.

Because the glass pane in the device pursuant to the invention is protected peripherally by at least one fastener cemented to it, and is detachably connected to the holding rail, the glass pane can be detached from the worn holding rail in case the holding rail is worn, after shifting the locking element(s) into the release position, and can be joined to a new holding rail which can then be reinstalled in the holding rail.

In one form thereof, the present invention provides a device for displaceably holding a glass pane in a sliding rail with at least one fastener to which a hot melt adhesive cushion is attached, and that has at least one locking element, and with an elongated holding rail displaceably mounted in the sliding rail that can be brought into engagement with the locking element(s), wherein the locking element(s) can be shifted between a locked position in which the fastener(s) is/are rigidly connected to the holding rail and a release position in which the engagement with the holding rail is released and the glass pane can be taken out of the holding rail, characterized by the fact that the holding rail has a holding slot extending lengthwise of such dimensions that it encloses peripherally a glass pane on its edge facing the holding rail.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
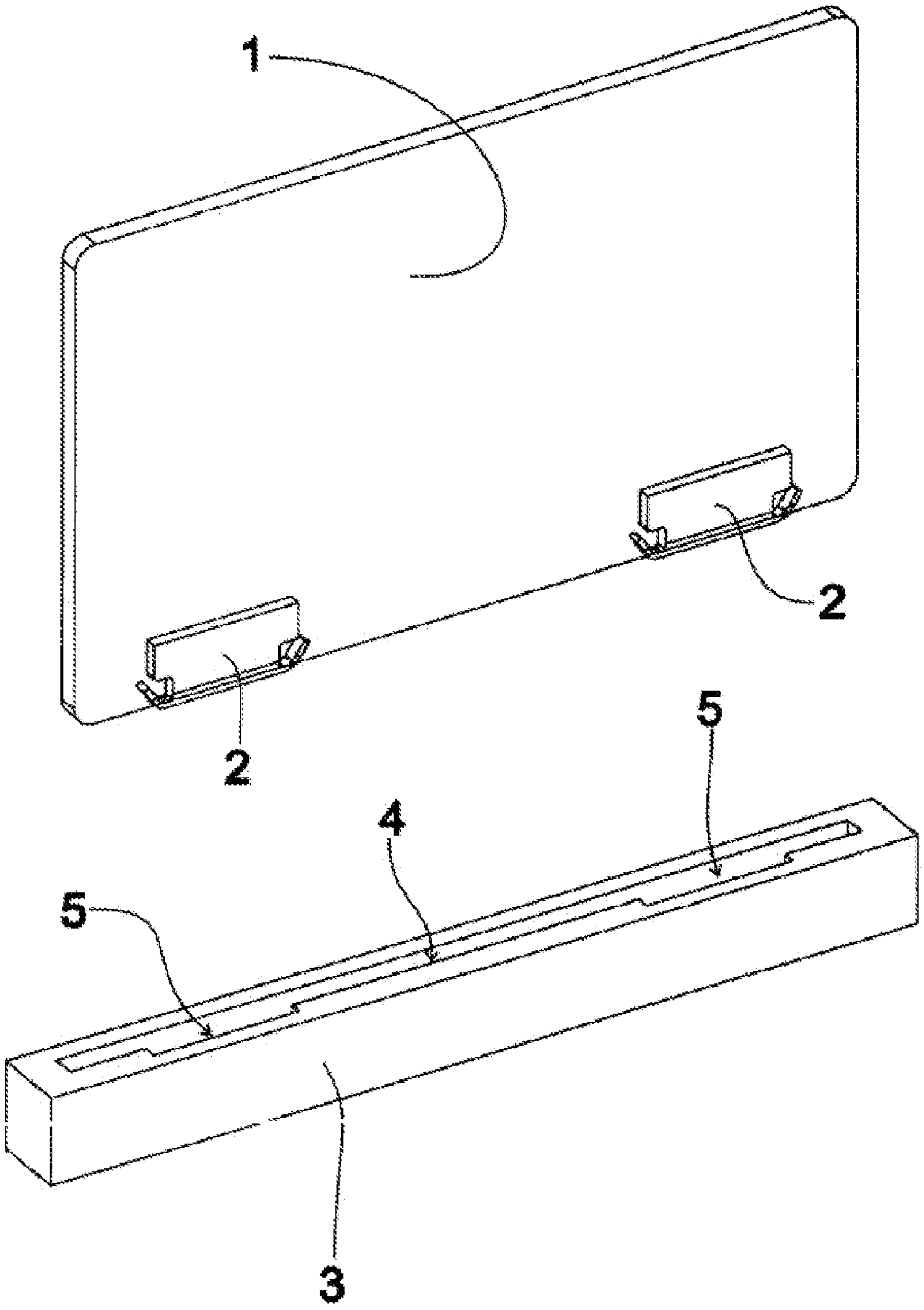
FIG. 1 in perspective view, a glass pane and an example of embodiment of a device pursuant to the invention with two fasteners, each of which is cemented to a corner area of the glass pane along one edge, and with a holding rail made to hold the glass pane and the fasteners before inserting the glass pane into the holding rail.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1, in a perspective view, shows a rectangular glass pane 1 to which a flat fastener 2 of an example of embodiment of a device pursuant to the invention, made of a hard elastic plastic, is cemented along one edge in each corner area, with about the same thickness as the glass pane 1. The example of embodiment according to FIG. 1 also has an elongated holding rail 3 made of metal or of a hard plastic, which is made with a holding slot 4 extending lengthwise and closed around its circumference.

The length of the holding slot 4 corresponds to the length of the edge of the glass pane 1, along which the fasteners 2 are placed. The holding pockets 5 corresponding dimensionally to the fasteners 2 in length and width and placed opposite the fasteners 2 are added to the holding slot 4.

Figure 2:
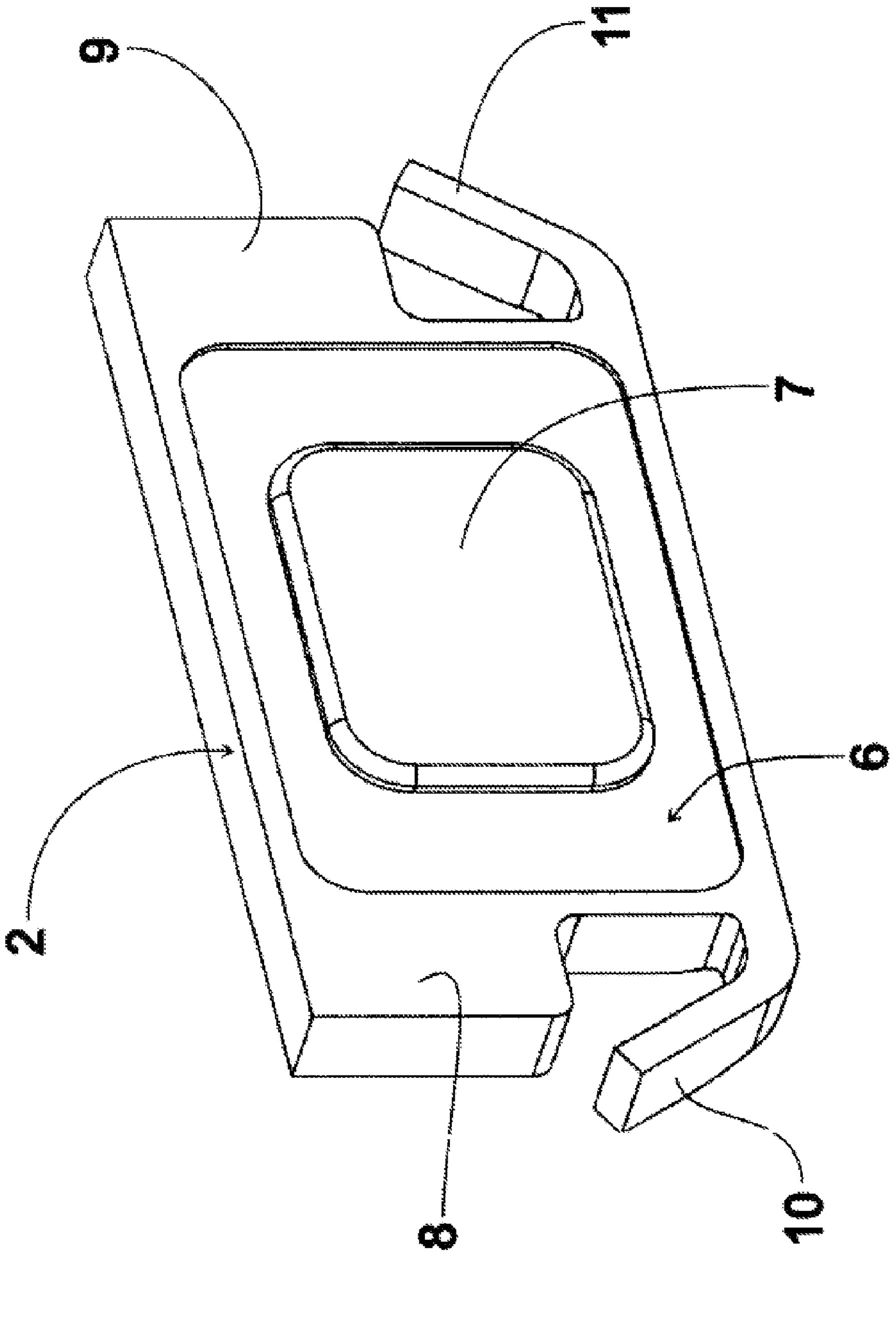
FIG. 2 in perspective view, a fastener of the example of embodiment according to FIG. 1.

FIG. 2, in a perspective view, shows a fastener 2 of the example of embodiment according to FIG. 1. The essentially rectangular fastener 2 on one flat face has a cushion recess with an encircling edge that holds a hot melt adhesive cushion 7 made of a hot melt adhesive, with the hot melt adhesive cushion 7 spaced circumferentially away from the edge of the cushion recess 6. The volumes of the cushion recess 6 and of the hot melt adhesive cushion 7 are matched to one another so that after the hot melt adhesive cushion 7 is melted to cement the fastener 2 to the glass pane, the cushion recess 6 is essentially filled, without having material of the hot melt adhesive cushion 7 escape over the edge of the cushion recess 6.

FIG. 2 also shows that each fastener 2 has lateral shoulders 8, 9 projecting beyond opposite shorter edges, which extend over about half the height of the fastener 2. Elastically flexible spring tabs 10, 11 are molded at one end onto the long edge opposite the lateral shoulders 8, 9 as locking elements; they extend diagonally outward toward the lateral shoulders 8, 9 and in the relaxed locking position shown in FIG. 2 they project beyond the lateral faces of the lateral shoulders 8, 9.

Figure 3:
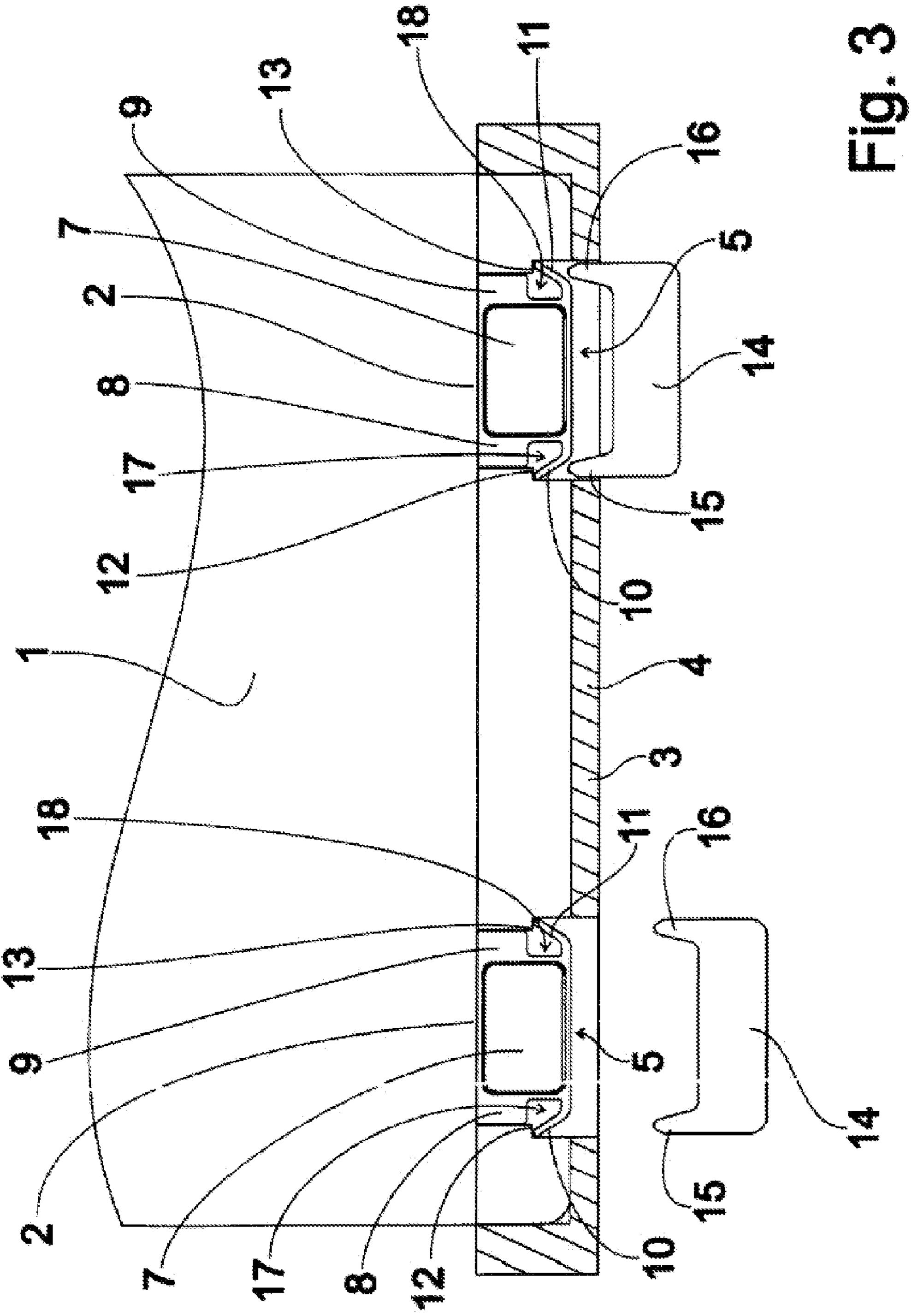
FIG. 3 in a longitudinal cross section, the example of embodiment according to FIG. 1 in an arrangement in which the glass pane is inserted into the holding rail with the fasteners attached to it, with suitable unlocking tools for releasing the engagement of the fasteners with the holding rail also being illustrated.

FIG. 3 shows a longitudinal cross section of the example of embodiment according to FIG. 1 in an arrangement in which the glass pane 1 is inserted into the holding rail 3 by its attached fasteners 2. FIG. 3 shows that in this arrangement, the free ends of each of the spring tabs 10, 11 grip behind a rear catch edge 12, 13 formed in the holding pocket 5, after they have been sprung into the holding pockets 5 dimensioned on the insertion side corresponding to the distance between the lateral faces of the lateral shoulders 8, 9. In this locked position, again relaxed, the fasteners 2 secure the glass pane 1 in the holding rail 3, with each of the lateral faces of the lateral shoulders 8, 9 resting against the opposite wall of the holding pocket 5 in question, and thus absorbing shear forces acting on the fastener 2, relieving pressure on the spring tabs 10, 11.

FIG. 3 also shows suitable unlocking tools 14 for releasing the engagement of the fasteners 2 with the holding rail 3. The unlocking tools 14 have pin-like spikes 15, 16 spaced to correspond to the distance between the spring tabs 10, 11, which can be inserted in the area of the spring tabs 10, 11 through an opening into a holding pocket 5, so that thereby the spring tabs 10, 11 can be shifted to assume a release position in tab clearances 17, 18 in extension of the lateral shoulders 8, 9 to the junction of the spring tabs 10, 11, in which the rear grip with the rear catch edges 12, 13 is released and thus the fastener 2 together with the glass pane 1 can again be removed from the holding pockets 5.

It is also possible to connect other component geometries detachably to the glass pane 1 with the fastening elements 2 according to the example of embodiment.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for displaceably holding a glass pane, comprising:

at least one fastener including a cushion of hot melt adhesive and at least one locking element;

an elongated holding rail, said holding rail including a holding slot extending lengthwise thereof along an axis and dimensioned to receive a glass pane, said holding rail further including a bottom opening opposite said holding slot, said locking element engageable with said holding rail and movable between a locked position in which its corresponding said fastener is rigidly connected to said holding rail and a release position in which engagement of said fastener with said holding rail is released and the glass pane is removable from said holding rail;

said holding slot including at least one holding pocket, said holding pocket dimensioned to receive said fastener;

said fastener including projecting lateral shoulders on opposite sides thereof, said shoulders resting against respective lateral boundary walls of said holding pocket when said fastener is inserted into said holding pocket;

said locking element of said fastener formed as at least one flexible spring tab extending along said axis of said holding slot, said holding pocket including at least one corresponding catch edge against which a free end of a respective said spring tab rests in said locked position; and each said lateral shoulder including a tab clearance facing a respective said spring tab, said tab clearance having a depth greater than a thickness of said spring tab, and said bottom opening disposed proximate a respective said spring tab; and an unlocking tool insertable into said bottom opening of said holding pocket from a side thereof opposite said fastener, said unlocking tool engagable with said at least one spring tab of said fastener to shift each said spring tab of said fastener to said released position.

2. The device of claim 1, wherein said locking element of said fastener is formed as two spring tabs disposed on opposite sides of said fastener along said axis of said holding slot.

3. A device for displaceably holding a glass pane, comprising:

at least one fastener including a cushion of hot melt adhesive and at least one locking element;

an elongated holding rail, said holding rail including a holding slot extending lengthwise thereof along an axis and dimensioned to receive a glass pane, said locking element engageable with said holding rail and movable along said axis between a locked position in which its corresponding said fastener is rigidly connected to said holding rail and a release position in which engagement of said fastener with said holding rail is released and the glass pane is removable from said holding rail;

said locking element of said fastener formed as two spring tabs disposed on opposite sides of said fastener along said axis of said holding slot;

said holding rail including a bottom opening opposite said holding slot; said holding slot includes at least one holding pocket, said holding pocket dimensioned to receive said fastener;

said fastener including projecting lateral shoulders on opposite sides thereof, said shoulders resting against respective lateral boundary walls of said holding pocket when said fastener is inserted into said holding pocket;

said holding pocket including at least one corresponding catch edge against which a free end of a respective said spring tab rests in said locked position; and each said lateral shoulder including a tab clearance facing a respective said spring tab, said tab clearance having a depth greater than a thickness of said spring tab, and said bottom opening is proximate a respective said spring tab; and an unlocking tool insertable into said bottom opening of said holding pocket from a side thereof opposite said fastener, said unlocking tool engagable with said at least one spring tab of said fastener to shift each said spring tab of said fastener to said released position.

* * * * *